Figure 1:
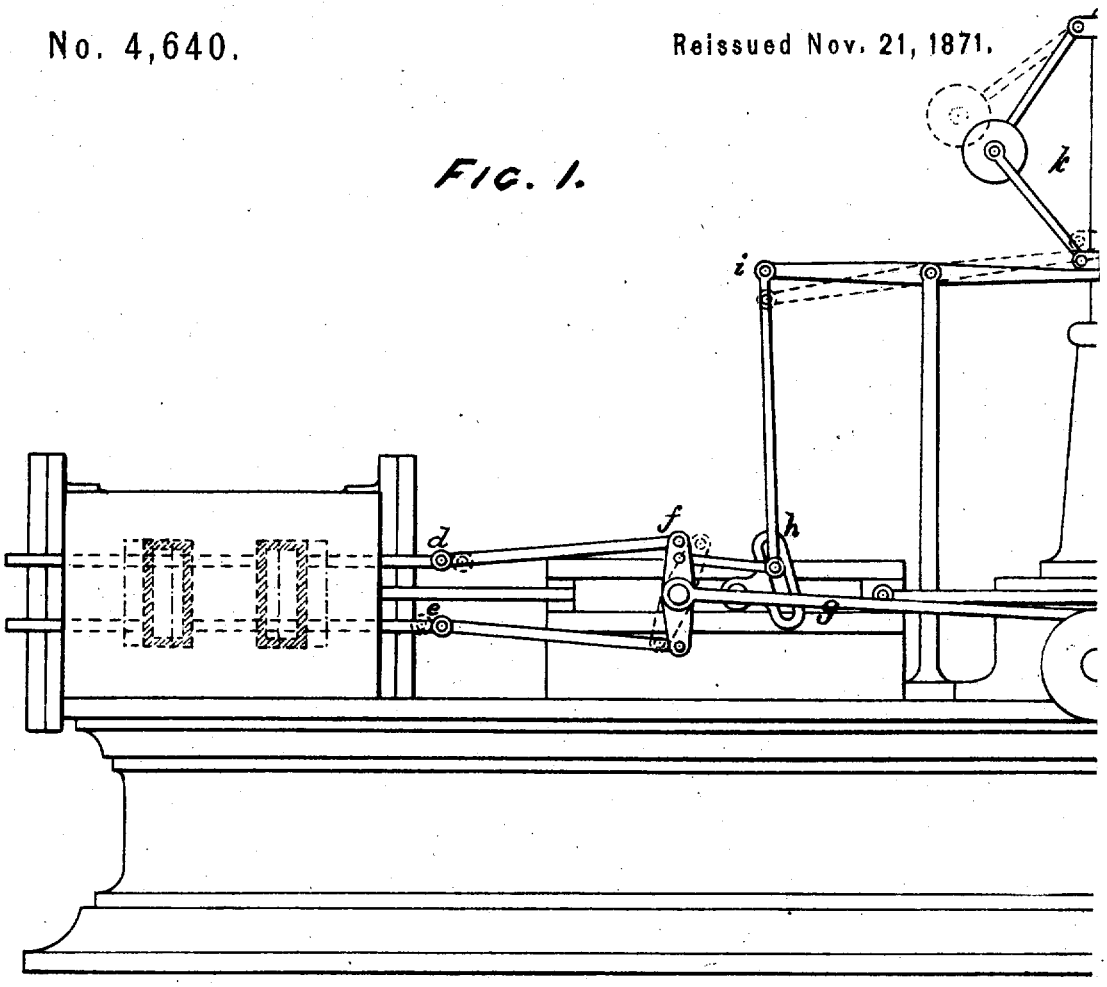
Figure 1:
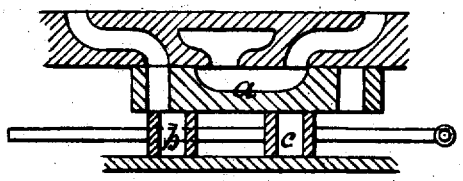

JOHN E. McKAY.

VARIABLE CUT OFF GEARING.

No. 4,640. Reissued Nov. 21, 1871.

FIG. II.

WITNESSES.

Nathan Lewis

Wm Kenner Hall

INVENTOR.

John E. McKay

AM. PHOTO-LITHOGRAPHIC CO. N.Y. (OSBORNE'S PROCESS.)

UNITED STATES PATENT OFFICE.

JOHN E. McKAY, OF NEW YORK, N. Y.

IMPROVEMENT IN VARIABLE CUT-OFF GEARINGS.

Specification forming part of Letters Patent No. 118,958, dated September 12, 1871; reissue No. 4,640, dated November 21, 1871.

*To all whom it may concern:*

Be it known that I, JOHN E. McKAY, of New York, in the county and State of New York, have invented a certain new and useful Improvement in Variable Cut-Off Gearing, of which the following is a specification:

The said invention relates to that form of slide-valve which has a cut-off or expansion-valve working on its back and closing the steam-openings, as may be required. When it has been desired to have it adjustable, the cut-off valve has hitherto been made in two sections, connected by a right-and-left screw, which passed as a stem to the exterior of the steam-chest, by which the blocks could be expanded or contracted, so that the length of the valve and the consequent point of its operation might be regulated from the outside while the engine was in operation. My improvement consists in connecting a similar expansion-valve with gearing, by which the governor operates upon the valve so as to expand its parts and cut off the steam at an earlier period of the stroke when the speed of the engine may have been increased; and also to contract the parts when the speed may have been lessened, and to cause the steam, therefore, to follow further. This object is accomplished, in the first place, by supplying each of the parts of the cut-off valve with a separate stem, and in connecting these stems to the opposite ends of a lever that is vibrated on its center by the collapse or expansion of the governor-balls. When the governor-balls and the parts of the valve are in their normal position, with the engine running at its required speed, the valve-lever is about at right angles with the stem at each end; so that if the angle of the lever should be altered either one way or the other the parts of the cut-off valve are correspondingly moved more together or apart. If the balls drop the valve-lever is turned and the parts of the valves brought more closely together, so that the steam-passages will be open a longer portion of the stroke; and if the balls become more divergent the lever is turned the other way and the parts of the valve spread further apart to close the steam-openings at an earlier portion of the stroke. It is also part of my invention to make each part of the cut-off valve as a box, open at the top and bottom, or on the two working faces, so that as it moves comparatively steam-tight between the slide-valve on one side and the steam-chest cover on the other, any leakage equally affects both sides and the valve is still balanced. If considered desirable, there may be an adjustable plate under the steam-chest bonnet or cover, by which the wear may be taken up; but it is not believed to be necessary, as a moderate leakage, which in a slide would occasion loss by blowing through from the steam to the exhaust, would only affect the rate of expansion in the action of a cut-off.

To enable others skilled in the art to which it appertains to make and use my invention, I will proceed to describe its construction and operation with reference to the drawing.

Figure 1 is a side elevation of the cylinder-end and middle of a horizontal engine to the center line of the governor, and Fig. 2 is a section of the valves, seat, and cover.

The steam-valve *a* has working between it and the cover the cut-off valves *b* and *c*, with their respective stems *d* and *e*, connected by links to the opposite ends of the lever *f*. The stem of each valve passes loosely through the other, and through a stuffing-box at the back end of the steam-chest, so that it may be supported at both front and rear. The distance apart of the cut-off valves is dependent upon the angularity of the lever *f*, which is mounted on a slide and receives its throw or motion from the eccentric rod *g*. The link *h* is mounted on the same slide and has the same motion, and a block sliding in its slot is connected to the angular lever *f*, and also to a vibrating lever, *i*, that clutches the moving collar of the governor *k*. The purpose served by this block sliding in the link is to prevent any inequality in the resistance of the cut-off valves reacting upon the governor-balls; the links being at about right angles to the direction of the thrust, the effect of any such inequality is there stopped. The curve of the link may be so made that the valves at either end of the cylinder will cut off at the same or different relative points of the stroke.

Where the continuous lines of the drawing show the relative positions of the various parts at any given speed the dotted lines illustrate the changes occasioned by an increase of speed upon the governor-balls, vibrating lever, angular lever, valve-stem, joints, and valves, the latter being spread apart to cut off shorter. In a similar manner a check in the speed of the engine which would cause the governor-balls to collapse would also spread the cut-off valves, so that the steam would be permitted to follow further.

The distinguishing feature of my invention, consisting in the connection of the governor with the parts of the cut-off valve by means of an angular lever or other analogous device by which the motion of the governor may be transferred to the cut-off valves, it is obvious that the governor need not necessarily be a ball governor, and it may be placed directly over the angular lever, and be connected directly thereto or to an arm projecting from it.

I claim as my invention—

The combination of a cut-off valve or valves, the intervening angular lever *f*, link *h*, and governor *k*, all constructed and operating substantially as and for the purpose set forth.

JOHN E. McKAY.

Witnesses:

WM. KEMBLE HALL,

NATHAN LEWIS.

(152)